(12) United States Patent
Dwivedi et al.

(10) Patent No.: US 10,289,538 B1
(45) Date of Patent: May 14, 2019

(54) SYSTEMS AND METHODS FOR FAILURE DETECTION WITH ORCHESTRATION LAYER

(71) Applicant: Capital One Services, LLC, McLean, VA (US)

(72) Inventors: Vipin Dwivedi, Frisco, TX (US); Renjith Pascas, Allen, TX (US); Shilpa Mittal, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/025,410

(22) Filed: Jul. 2, 2018

(51) Int. Cl.
*G06F 8/60* (2018.01)
*G06F 11/36* (2006.01)

(52) U.S. Cl.
CPC ............ *G06F 11/3688* (2013.01); *G06F 8/60* (2013.01); *G06F 11/3612* (2013.01); *G06F 11/3616* (2013.01); *G06F 11/3692* (2013.01)

(58) Field of Classification Search
CPC ..... G06F 11/3688; G06F 11/3692; G06F 8/60
See application file for complete search history.

(56) References Cited

U.S. PATENT DOCUMENTS

| | | | | |
|---|---|---|---|---|
| 9,842,045 | B2 * | 12/2017 | Heorhiadi | H04L 41/5038 |
| 9,871,848 | B1 | 1/2018 | Shanmugam | |
| 10,013,275 | B2 * | 7/2018 | Vyas | G06F 9/5055 |
| 10,013,550 | B1 * | 7/2018 | Ahuja | H04L 67/1008 |
| 10,169,220 | B2 * | 1/2019 | Rajagopalan | G06F 11/3688 |
| 2005/0086530 | A1 * | 4/2005 | Goddard | G06F 11/008 726/4 |
| 2010/0299437 | A1 * | 11/2010 | Moore | H04L 67/1008 709/226 |
| 2010/0318974 | A1 * | 12/2010 | Hrastnik | G06F 11/3696 717/135 |
| 2013/0246853 | A1 | 9/2013 | Salame | |
| 2014/0229928 | A1 * | 8/2014 | Edstrom | G06F 8/656 717/171 |
| 2016/0124742 | A1 * | 5/2016 | Rangasamy | H04L 47/70 717/103 |
| 2016/0127254 | A1 | 5/2016 | Kumar et al. | |
| 2017/0046146 | A1 * | 2/2017 | Jamjoom | G06F 8/62 |
| 2017/0242784 | A1 * | 8/2017 | Heorhiadi | H04L 41/5038 |
| 2018/0039567 | A1 * | 2/2018 | Rajagopalan | G06F 11/3672 |
| 2018/0039570 | A1 * | 2/2018 | Rajagopalan | G06F 11/3636 |

(Continued)

*Primary Examiner* — Paul Contino
(74) *Attorney, Agent, or Firm* — Hunton Andrews Kurth LLP (57) ABSTRACT

A system and method in accordance with examples may include systems and methods for detecting failure of microservice applications in communication with an orchestration layer of a microservice-architecture. The system may include memory and an orchestration layer including one or more processors coupled to the memory. The one or more processors may be configured to connect the orchestration layer to a plurality of microservice applications that are each associated with a respective dataset. The one or more processors may be configured to validate, responsive to the connection of each of the microservice applications, the microservice applications by performing a first test and a second test. The one or more processors may be configured to deploy, responsive to the validation of the microservice applications, the microservice applications to execute a plurality of workflow actions.

19 Claims, 4 Drawing Sheets

(56) References Cited

U.S. PATENT DOCUMENTS

| | | | |
|---|---|---|---|
| 2018/0077080 A1* | 3/2018 | Gazier | H04L 12/4641 |
| 2018/0107586 A1* | 4/2018 | Vyas | G06F 9/455 |
| 2018/0113680 A1* | 4/2018 | Browning | G06F 8/30 |
| 2018/0136931 A1* | 5/2018 | Hendrich | G06F 11/302 |
| 2018/0136959 A1* | 5/2018 | Vyas | G06F 9/5055 |
| 2018/0152534 A1* | 5/2018 | Kristiansson | H04L 67/16 |
| 2018/0159747 A1* | 6/2018 | Chang | H04L 41/5045 |
| 2018/0198845 A1* | 7/2018 | Kulp | H04L 67/10 |
| 2018/0239692 A1* | 8/2018 | Kalyanasundram | G06F 11/3664 |
| 2018/0270125 A1* | 9/2018 | Jain | H04L 67/1097 |
| 2018/0309630 A1* | 10/2018 | Zhao | H04L 41/145 |
| 2018/0331905 A1* | 11/2018 | Toledo | H04L 41/0816 |

\* cited by examiner

SYSTEMS AND METHODS FOR FAILURE DETECTION WITH ORCHESTRATION LAYER

FIELD OF THE DISCLOSURE

The present disclosure relates to systems and methods to detect the failure of microservice applications in communication with an orchestration layer.

BACKGROUND OF THE DISCLOSURE

Microservices are used for a variety of devices (e.g. mobile and desktop devices) and are frequently used in many fields associated with a variety of users (e.g. customers, partners, employees, etc.).

Current solutions for failure detection of microservice applications expend a great amount of processing resources and time only to find out that, after deployment of the applications, a system is not working for a particular functionality associated with a microservice application because its underlying services are unavailable to operate.

These and other drawbacks exist.

SUMMARY OF THE DISCLOSURE

Various embodiments of the present disclosure provide systems and methods to detect the failure of microservice applications in communication with an orchestration layer of a microservice-architecture. In one example, a system may include memory and an orchestration layer including one or more processors coupled to the memory. The one or more processors may be configured to connect the orchestration layer to a plurality of microservice applications that are each associated with a respective dataset. The one or more processors may be configured to validate, responsive to the connection of each of the plurality of microservice applications, the plurality of microservice applications by performing a first test and a second test. The one or more processors may be configured to deploy, responsive to the validation of the plurality of microservice applications, the plurality of microservice applications to execute a plurality of workflow actions.

In an example, a method may include establishing, by one or more processors coupled to memory, an orchestration layer. The method may include receiving, at the orchestration layer, a respective dataset from each of a plurality of microservice applications. The method may include validating, by the one or more processors and based on receiving the respective dataset, the plurality of microservice applications by executing a first test prior to executing a second test. The method may include deploying, by the one or more processors and based on validating the plurality of microservice applications, the plurality of microservice applications to execute a plurality of workflow actions.

In an example, a computer-readable medium storing instructions that, when executed by one or more processors, cause the one or more processors to create an orchestration engine. Further, the computer-readable medium storing instructions that, when executed by the one or more processors, cause the one or more processors to establish connectivity between the orchestration layer and a plurality of microservice applications that are each associated with a corresponding dataset that is at least partially overlapping with other datasets. Also, the computer-readable medium storing instructions that, when executed by the one or more processors, cause the one or more processors to certify, based on the establishment of connectivity with the plurality of microservice applications, the plurality of microservice applications by conducting a plurality of tests. Moreover, the computer-readable medium storing instructions that, when executed by the one or more processors, cause the one or more processors to deploy, based on the certification of plurality of microservice applications, the plurality of microservice applications to execute a plurality of workflow actions.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION

The following description is intended to convey a thorough understanding of the embodiments described by providing a number of specific exemplary embodiments and details involving systems and methods to detect the failure of microservice applications in communication with an orchestration layer or engine. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in various embodiments, depending on specific design and other needs.

According to the various examples of the present disclosure, systems and methods use the technical capabilities to detect failure of microservice applications in communication with an orchestration layer of a microservice-architecture. In some examples, the system may be configured to remain operational through a mock service application despite the failure detection of at least one microservice application, as discussed below. Deploying microservice applications is a processing extensive process and is not worthwhile if, after deployment of the applications, the expected behavior of the applications is not working which necessitates unnecessary and timely debugging processes. Unlike conventional systems in which a check is conducted after deployment of applications, the systems and methods disclosed herein conduct checks as a post-implementation step, or a pre-deployment step; that is, performing validation of the microservice applications after they have begun implementation for connectivity, or performing validation of the microservice applications prior to their deployment. In this manner, processing time is avoided in conducting debugging processes (which may range, for example, from about thirty minutes to over four hours) after deployment of the applications to determine whether it is, for example, in working condition and/or available to serve. As further explained herein, this specific process may be referred to as a fail fast pattern which may be utilized when development and deployment of applications is fast-paced and frequent deployments are required in a given time frame, such as in a single day. Through the mock service application, the system may be configured to simulate other systems which may have not been developed or otherwise not be available.

Figure 1:
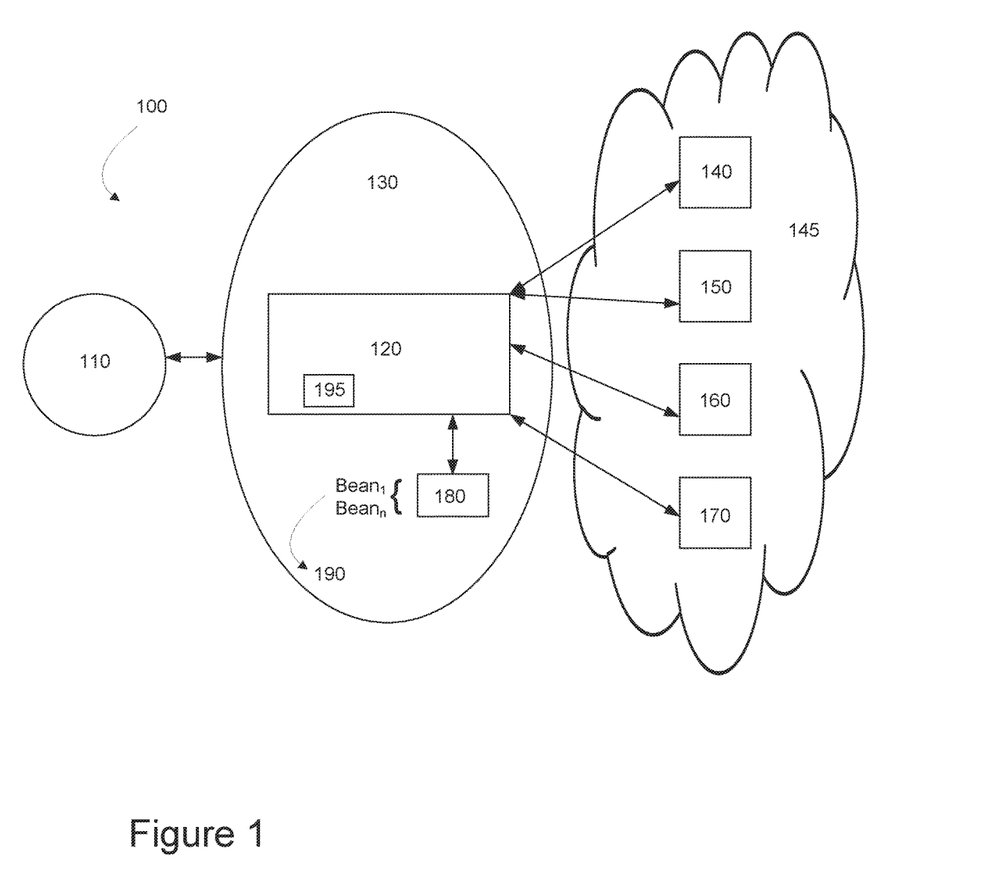
FIG. 1 depicts a system to detect the failure of microservice applications according to an example of the present disclosure.

FIG. 1 illustrates a system 100 detect the failure of microservice applications in communication with an orchestration layer according to an example of the present disclosure. As further discussed below, system 100 may include client device 110, orchestration layer 120, application programming interface (API) gateway 130, microservice applications 140, 150, 160, 170, and spring integration framework 180. Although FIG. 1 illustrates four microservice applications 140, 150, 160, 170, system 100 may include any number of microservice applications.

Client device 110, (also referred to as end node 110), may be a network-enabled computer. As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client, a fat client, an Internet browser, or other device. Client device 110 also may be a mobile device. For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

In various examples according to the present disclosure, client device 110 may be understood in the context of an auto loan and vehicle purchase platform. The one or more network-enabled computers of system 100 may execute one or more software applications that uses one or more microservice applications 140, 150, 160, 170 and may also enable, for example, network communications with one or more components of system 100 and transmit and/or receive data. For example, data that is configured to be transmitted and/or received may include one or more of vehicle identification number, mileage information, vehicle information, identity of the dealer, dealer reviews and/or dealer ratings, serviceability of the dealer, loan terms, credit check applications, pre-approval forms, loan financing, and/or any combination thereof. As discussed below, microservice applications 140, 150, 160, 170 may each be a part of one or more cloud containers (not shown), may be coupled to one or more servers and/or databases (not shown) associated with an auto loan and vehicle purchase system, or may be hosted on cloud 145.

For example, client device 110 may be in communication with API gateway 130 via one or more networks (not shown), and may operate as a respective front-end to back-end pair with orchestration layer 120. Client device 110 may transmit, for example from a mobile device application executing on client device 110, one or more requests to API gateway 130. The one or more requests may be associated with retrieving one or more data sets from microservice applications 140, 150, 160, 170. Orchestration layer 120 may receive the request from client device 110. Based on the one or more requests from client device 110, orchestration layer 120 may be configured to retrieve the requested one or more data sets from one or more of microservice applications 140, 150, 160, 170. Based on receipt of the requested one or more data sets from one or more microservice applications, orchestration layer 120 may be configured to orchestrate a response and thereafter may be configured to transmit the orchestrated response to client device 110.

Orchestration layer 120 may include one or more processors, which are coupled to memory. Orchestration layer 120 may be configured as a central system, server or platform to control and call various microservice applications 140, 150, 160, 170 at different times to execute a plurality of workflow actions. Orchestration layer 120 may comprise a lightweight orchestration layer. Orchestration layer 120 may be configured to connect to microservice applications 140, 150, 160, 170, as discussed below. Orchestration layer 120 may be connected to at least one client device 110.

"Microservices" as used herein may include independent processes or applications that each provide a distinct capability, for example, a business functionality. Microservices may be hosted in one or more cloud and or cloud-based systems. Microservices may be a part of one or more cloud containers (not shown) that may be configured to operate the applications. In various examples according to the present disclosure, microservice applications 140, 150, 160, 170 may be understood in the context of an auto loan and vehicle purchase platform. For example, numerous types of data and formats may be provided from a plurality of servers and/or databases of third parties, such as servers and/or databases from vehicle dealers, to microservice applications 140, 150, 160, 170. The data may be categorized by microservice applications 140, 150, 160, 170 into a plurality of data sets, such as a first data set comprising a vehicle identification number, mileage, and other vehicle information, and/or another data set comprising an identity of the dealer, dealer reviews and/or dealer ratings, serviceability of the dealer, and/or any combination of the sets thereof. The data sets may be at least partially overlapping with other data sets. The data sets may be loaded in a batch format for data retrieval from the third parties at a predetermined rate, for example, every three to four hours. Once the respective data sets are received, its contents may be combined or otherwise consolidated by microservice applications 140, 150, 160, 170.

As discussed above, microservice applications 140, 150, 160, 170 may be each associated with a respective dataset. Orchestration layer 120 may be configured to call each of microservice applications 140, 150, 160, 170 through a protocol, such as a spanning tree protocol (STP). For example, although the fail fast pattern described herein may be configured to use hypertext transfer protocol (HTTP) and HTTP secure (HTTPS), the pattern may be used with any protocol of stateless communication. For example, orchestration layer 120 may be configured to validate, responsive to the connection of each of microservice applications 140, 150, 160, 170, microservice applications 140, 150, 160, 170 by performing a first test and a second test. The first and/or second tests may be performed for only some, such as a designated set of microservice applications 140, 150, 160, 170 or all of microservice applications 140, 150, 160, 170.

The first and/or second tests also may be performed in a sequential or a non-sequential manner. For example, from a sequential perspective, a first test may be performed for a first microservice application 140 and a second test may be performed for the first microservice application 140. Thereafter, the first test may be performed for a second microservice application 150 and the second test may be performed for the second microservice application 150. This manner or pattern may repeat sequentially up to and including the nth microservice application. In contrast, from a non-sequential perspective, a first test may be performed for a first microservice application 140 and a second test may be performed for the first microservice application 140. Thereafter, the first test may be performed for a third microservice application 160 and the second test may be performed for the third microservice application 160 before proceeding to the second microservice application 150 or proceeding to a fourth microservice application 170. This manner or pattern may then repeat non-sequentially up to and including the nth microservice application. In other words, it is not necessary that the tests for the first through the nth microservice applications are performed in that order. Rather, as discussed above, a designated set of microservice applications 140, 150, 160, 170 may be decided, for example, by orchestration layer 120 to determine which microservice applications 140, 150, 160, 170 are subject to performance of the first and second tests.

The first test may include an availability check. The availability check may be configured to determine whether all microservice applications 140, 150, 160, 170 are at least available and/or connected to orchestration layer 120 through application programming interface (API) gateway 130. For example, the first test may include whether a signal is received or not within a predetermined threshold time, such as two seconds, the signal being indicative of responsiveness associated with connectivity of microservice applications 140, 150, 160, 170 and orchestration layer 120 via API gateway 130. For example, a single API gateway 130 may be configured to connect microservice applications 140, 150, 160, 170 to orchestration layer 120. In some examples, there may be more than one gateway configured to connect microservice applications 140, 150, 160, 170 to orchestration layer 120. The first test may be associated with determining availability, including receiving status updates based on whether microservice applications 140, 150, 160, 170 is/are operational and/or running and/or active. The first test may also be associated with connectivity, including receiving status updates based on whether microservice applications 140, 150, 160, 170 is communicating (and with who) and/or connected (and to who).

The second test may include a health check. The health check may be configured to determine whether all microservice applications 140, 150, 160, 170 are configured to serve traffic associated with the respective dataset. In some examples, the health check may depend on microservice application 140, 150, 160, 170 logic to specify that it is health by providing one or more parameters, such as one or more business-related parameters. For example, a parameter may comprise a status and/or response from microservice application 140, 150, 160, 170 indicating the latest loaded data for the particular microservice application 140, 150, 160, 170, which differs from the industry standard in which a mere "OK" response is provided by microservice application 140, 150, 160, 170. In some examples, there may be no dependency between the first test and the second test. For example, only the second test may be performed in substitute of the first test, and further, for microservice applications 140, 150, 160, 170. In some examples, "traffic" may refer to microservice application 140, 150, 160, 170 as being ready and/or available to accept one or more requests through specific protocols from one or more client devices that are configured to utilize or expose functionality of microservice applications 140, 150, 160, 170. Orchestration layer 120 may be configured to deploy, responsive to the validation of microservice applications 140, 150, 160, 170, microservice applications 140, 150, 160, 170 to execute a plurality of workflow actions. For example, a workflow action may define functionalities, such as different business functionalities, that orchestration layer 120 is performing by one or more microservice applications 140, 150, 160, 170.

Also, system 100 may include spring integration framework 180, such as a Java or language-neutral spring integration framework, which may include a plurality of beans 190, such as bean 1, bean 2, bean n, etc. Spring integration framework 180 may be implemented in other languages, such as Python, and is not limited to Java. Beans 190 may be each representative of a unit of work. Spring integration framework 180 may be configured to implement data flow, for example via JavaScript Object Notation (JSON), between microservice applications 140, 150, 160, 170 and orchestration layer 120 by at least one of beans 190 of spring integration framework 180. Spring integration framework 180 may be configured to implement data flow, for example via JavaScript Object Notation (JSON), orchestration layer 120 and client device 110 by at least one of beans 190 of spring integration framework 180.

In various examples, system 100 may include an application, such as a mock service application 195, which may reside in orchestration layer 120. When executed, mock service application 195 may be configured to override behavior of data flow such that microservice applications 140, 150, 160, 170 are deployed even after determining that at least one of microservice applications 140, 150, 160, 170 failed the second test. Based on results of the mock service application 195 indicative of the at least one of microservice applications 140, 150, 160, 170 failing the second test, a corresponding message may be logged in one or more databases (not shown), rather than producing an error notification. The corresponding message may comprise a notification that this service is a simulated service, i.e., a mock service. Based on the logged corresponding message, a user of client device 110 may decide to mock microservice applications 140, 150, 160, 170 which are not intended for use. Thus, mock service application 195 may provide for deployment with information about microservice applications 140, 150, 160, 170. For example, as further discussed below, FIG. 3 (mock failure) and FIG. 4 (mock success) illustrate instances of when orchestration layer 120 may be deployed with respect to mock service application.

Figure 2:
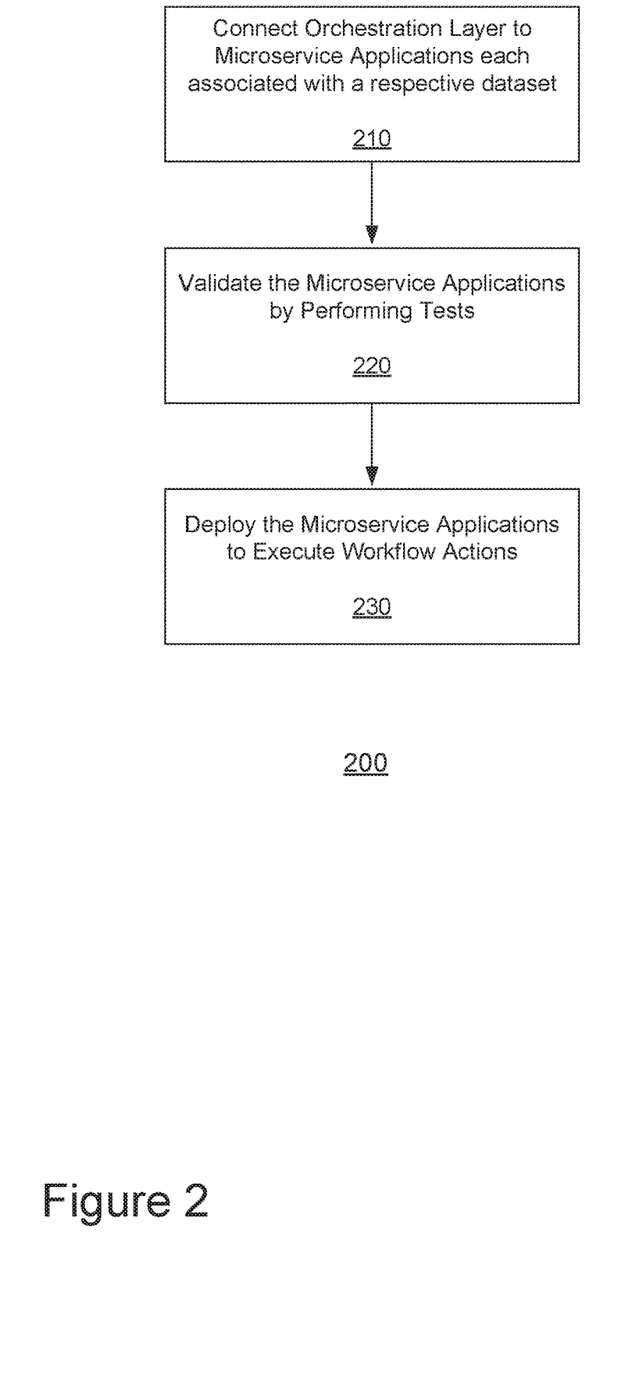
FIG. 2 depicts a method to detect the failure of microservice applications according to an example of the present disclosure.

FIG. 2 illustrates an example method 200 to detect the failure of microservice applications. As explained below, method 200 may reference same or similar components of system 100.

At block 210, an orchestration layer, (e.g., an orchestration layer 120 as shown and described in FIG. 1), may be configured to connect to a plurality of microservice applications, (e.g., microservice applications similar to microservice applications 140, 150, 160, 170 as shown and described in FIG. 1) each associated with a respective dataset. The connection between the orchestration layer and the microservice applications may be based on one or more requests from a client device, (e.g. a client device similar to client device 110 as shown and described in FIG. 1). For example, the client device may be in communication with an API gateway (e.g. an API gateway similar to API gateway 130 as shown and described in FIG. 1) via one or more networks, and may operate as a respective front-end to back-end pair with the orchestration layer. The client device may transmit, for example from a mobile device application executing on the client device, one or more requests to the API gateway. The one or more requests may be associated with retrieving one or more data sets from the microservice applications. The orchestration layer may receive the request from the client device. Based on receipt of the one or more requests from the client device, the orchestration layer may be configured to retrieve the requested one or more data sets from one or more of the microservice applications. Based on receipt of the requested one or more data sets from the one or more microservice applications, the orchestration layer may be configured to orchestrate a response and thereafter may be configured to transmit the orchestrated response to the client device.

In various examples according to the present disclosure, the client device may be understood in the context of an auto loan and vehicle purchase platform. The one or more network-enabled computers may execute one or more software applications that uses the one or more microservice applications and may also enable, for example, network communications with one or more components of the system to transmit and/or receive data. For example, data that is configured to be transmitted and/or received may include one or more of vehicle identification number, mileage information, vehicle information, identity of the dealer, dealer reviews and/or dealer ratings, serviceability of the dealer, loan terms, credit check applications, pre-approval forms, loan financing, and/or any combination thereof. As discussed below, the microservice applications may each be a part of one or more cloud containers, may be coupled to one or more servers and/or databases associated with an auto loan and vehicle purchase system, or may be hosted on a cloud.

The orchestration layer may include one or more processors, which are coupled to memory. The orchestration layer may be configured as a central system, server or platform to control and call various microservice applications at different times to execute a plurality of workflow actions. The orchestration layer may comprise a light-weight orchestration layer. The orchestration layer may be configured to connect to the microservice applications, as discussed below. The orchestration layer may be connected to at least one client device.

Microservices may be hosted in one or more cloud and or cloud-based systems. Microservices may be a part of one or more cloud containers (not shown) that may be configured to operate the applications. In various examples according to the present disclosure, microservice applications may be understood in the context of an auto loan and vehicle purchase platform. For example, numerous types of data and formats may be provided from a plurality of servers and/or databases of third parties, such as servers and/or databases from vehicle dealers, to microservice applications. The data may be categorized by the microservice applications into a plurality of data sets, such as a first data set comprising a vehicle identification number, mileage, and other vehicle information, and/or another data set comprising an identity of the dealer, dealer reviews and/or dealer ratings, serviceability of the dealer, and/or any combination of the sets thereof. The data sets may be at least partially overlapping with other data sets. The data sets may be loaded in a batch format for data retrieval from the third parties at a predetermined rate, for example, every three to four hours. Once the respective data sets are received, its contents may be combined or otherwise consolidated by the microservice applications. As discussed above, the microservice applications may be each associated with a respective dataset. The orchestration layer may be configured to call each of the microservice applications through a protocol, such as a spanning tree protocol (STP). For example, although the fail fast pattern described herein may be configured to use HTTP and HTTPS, the pattern may be used with any protocol of stateless communication.

At block 220, the orchestration layer may be configured to validate, responsive to the connection of each of the plurality of microservice applications of block 210, the plurality of microservice applications by performing a first test and a second test. The first and second tests may be performed for only some, such as a designated set of microservice applications or all of microservice applications.

The first and second tests also may be performed in a sequential or a non-sequential manner. For example, from a sequential perspective, a first test may be performed for a first microservice application and a second test may be performed for the first microservice application. Thereafter, the first test may be performed for a second microservice application and the second test may be performed for the second microservice application. This manner or pattern may repeat sequentially up to and including the nth microservice application. In contrast, from a non-sequential perspective, a first test may be performed for a first microservice application and a second test may be performed for the first microservice application. Thereafter, the first test may be performed for a third microservice application and the second test may be performed for the third microservice application before proceeding to the second microservice application or proceeding to a fourth microservice application. This manner or pattern may then repeat non-sequentially up to and including the nth microservice application. In other words, it is not necessary that the tests for the first through the nth microservice applications are performed in that order. Rather, as discussed above, a designated set of microservice applications may be decided, for example, by the orchestration layer to determine which microservice applications are subject to performance of the first and second tests.

The first test may include an availability check. The availability check may be configured to determine whether all microservice applications are at least available and/or connected to the orchestration layer through an application programming interface (API) gateway. For example, a single API gateway may be configured to connect the microservice applications to the orchestration layer. In some examples, there may be more than one gateway configured to connect one or more microservice applications to the orchestration layer. The first test may be associated with determining availability, including receiving status updates based on whether the microservice applications is/are operational and/or running and/or active. The first test may also be associated with connectivity, including receiving status updates based on whether the microservice applications is/are communicating (and with who) and/or connected (and to who). For example, the first test may include whether a signal is received or not within a predetermined threshold time, such as two seconds, the signal being indicative of responsiveness associated with connectivity of the microservice applications and orchestration layer via the API gateway.

The second test may include a health check. The health check may be configured to determine whether all the microservice applications are configured to serve traffic associated with the respective dataset. In some examples, a health check may depend on microservice application logic to specify that it is health by providing one or more parameters, such as one or more business-related parameters. For example, a parameters may comprise a status and/or response from one or more of the microservice applications indicating the latest loaded data for the particular microservice application, which differs from the industry standard in which a mere "OK" response is provided by the microservice application. In some examples, there may be no dependency between the first test and the second test. For example, only the second test may be performed in substitute of the first test for one or more microservice applications. In some examples, "traffic" may refer to one or more microservice applications as being ready and/or available to accept one or more requests through specific protocols from one or more client devices that are configured to utilize or expose functionality of the microservice applications.

Also, system may include spring integration framework (similar to spring integration framework 180 as described above with respect to FIG. 1), such as a Java or language-neutral spring integration framework, which may include a plurality of beans, such as bean 1, bean 2, bean n, etc. (similar to beans 190 as described above with respect to FIG. 1). The spring integration framework may be implemented in other languages, such as Python, and is not limited to Java. The beans may be each representative of a unit of work. The spring integration framework may be configured to implement data flow, for example via JavaScript Object Notation (JSON), between the microservice applications and the orchestration layer by at least one of beans of the spring integration framework. The spring integration framework may be configured to implement data flow, for example via JavaScript Object Notation (JSON), between the orchestration layer and the client device by at least one of beans of the spring integration framework.

In various examples, system may include an application, such as a mock service application (similar to mock service application 195 as described above with respect to FIG. 1), which may reside in the orchestration layer. When executed, the mock service application may be configured to override behavior of data flow such that the microservice applications are deployed even after determining that at least one of the microservice applications failed the second test. Based on results of the mock service application indicative of the at least one of microservice applications failing the second test, a corresponding message may be logged in one or more databases (not shown), rather than producing an error notification. The corresponding message may comprise a notification that this service is mocked. Based on the logged corresponding message, a user of the client device may decide to mock the microservice applications which are not intended for use. Thus, the mock service application may provide for deployment with information about the microservice applications.

At block 230, the orchestration layer may be configured to deploy, responsive to the validation of the plurality of microservice applications of block 220, the plurality of microservice applications to execute a plurality of workflow actions.

Figure 3:
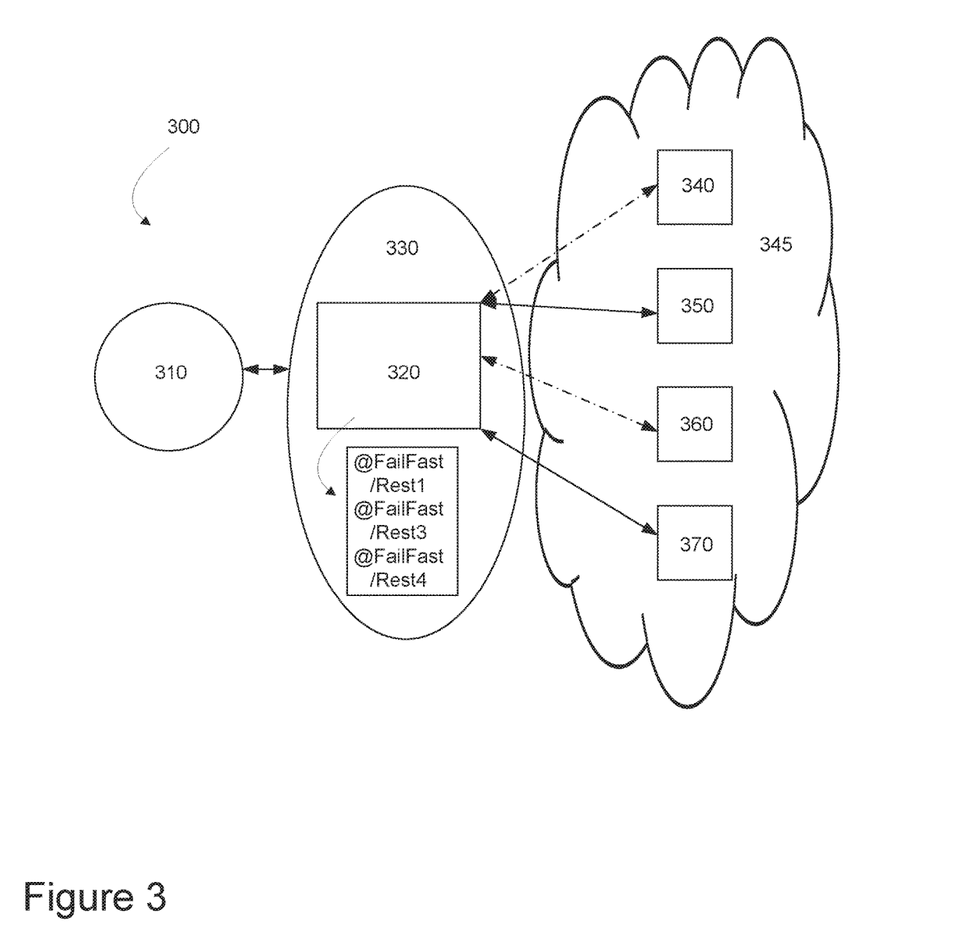
FIG. 3 depicts a system to process the failure of microservice applications in connection with a failure stage of a mock service application according to an example of the present disclosure.

FIG. 3 illustrates a system 300 process the failure of microservice applications in connection with a failure stage of a mock service application according to an example of the present disclosure. System 300 may include the same or similar components as illustrated in system 100. For example, system 300 may include client device 310 (similar to client device 110 as described above with respect to FIG. 1), orchestration layer 320 (similar to orchestration layer 120 as described above with respect to FIG. 1), application programming interface (API) gateway 330 (similar to API gateway 130 as described above with respect to FIG. 1), microservice applications 340, 350, 360, 370 (similar to microservice applications 140, 150, 160, 170 described above with respect to FIG. 1), cloud 345 (similar to cloud 145 as described above with respect to FIG. 1), and spring integration framework (not shown, similar to spring integration framework 180 as described above with respect to FIG. 1). Although FIG. 3 illustrates four microservice applications 340, 350, 360, 370, system 300 may include any number of microservice applications.

In FIG. 3, orchestration layer 320 may not be deployed (or may fail to deploy) because, for example, at least one or more of microservice applications 340, 350, 360, 370 is not available (or failed) at the time of orchestration layer 320 startup. In FIG. 3, orchestration layer 320 may not be marked for mocking, and thus may be indicated by @Fail-Fast annotation. For example, at least one or more of microservice applications 340, 350, 360, 370 may not be available (or failed) to serve traffic because of not passing the availability check and/or the health check. Orchestration layer 320 may be configured to receive one or more responses from different microservice applications 340, 350, 360, 370. Orchestration layer 320 may receive data from at least two of microservice applications 340, 350, 360, 370, such as microservice applications 340 and 350 prior to orchestration layer 320 orchestrating and providing the corresponding orchestrated response to client device 310. In one example, the corresponding orchestrated response transmitted from orchestration layer 320 to client device 310 may include orchestration layer 320 combining a response received from each of microservice applications, such as from 340 and 350.

With respect to communications and data transfers between orchestration layer 320 and microservice applications 340, 350, 360, 370, the solid line may represent that a connection is always available between orchestration layer 320 and microservice application, such as microservice applications 350 and 370. With respect to communications and data transfers between orchestration layer 320 and microservice applications 340, 350, 360, 370, the dashed line may represent that a request for connection thereto has been performed and a response to the request is pending, such as between orchestration layer 320 and microservice application and microservice applications 340 and 360. Microservice applications 340, 350, 360, 370 may be stateful, stateless, and/or any combination thereof. For example, stateful microservice applications 340, 350, 360, 370 may be configured to retrieve data, for example responsive to one or more requests of data from orchestration layer 320, from one or more databases (not shown). In contrast, stateless microservices 340, 350, 360, 370 may be configured to receive and/or transmit one or more requests of data without saving or retrieving the data from the one or more databases (not shown), as microservices 340, 350, 360, 370 may be connected thereto, transmit data responsive to one or more requests from orchestration layer 320, and terminating the connection.

Figure 4:
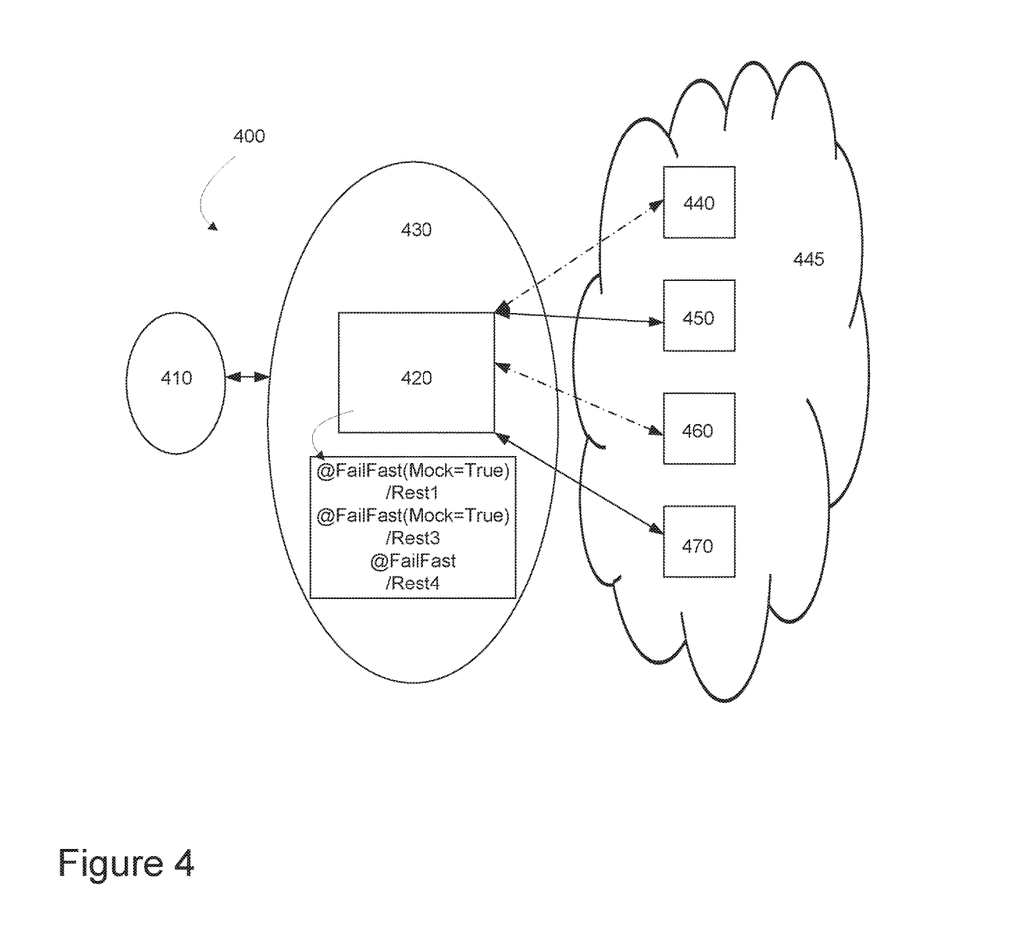
FIG. 4 depicts a system to process the failure of microservice applications in connection with a success stage of a mock service application according to an example of the present disclosure.

FIG. 4 illustrates a system 400 process the failure of microservice applications in connection with a success stage of a mock service application according to an example of the present disclosure. System 400 may include the same or similar components as illustrated in system 100. For example, system 400 may include client device 410 (similar to client device 110 as described above with respect to FIG. 1), orchestration layer 420 (similar to orchestration layer 120 as described above with respect to FIG. 1), application programming interface (API) gateway 430 (similar to API gateway 130 as described above with respect to FIG. 1), microservice applications 440, 450, 460, 470, (similar to microservice applications 140, 150, 160, 170 described above with respect to FIG. 1), cloud 445 (similar to cloud 145 as described above with respect to FIG. 1), and spring integration framework (not shown, similar to spring integration framework 180 as described above with respect to FIG. 1). Although FIG. 4 illustrates four microservice applications 440, 450, 460, 470, system 400 may include any number of microservice applications.

In FIG. 4, orchestration layer 420 may be deployed (or successful deployment) because, for example, although at least one or more of microservice applications 440, 450, 460, 470 is not available (or failed) at the time of orchestration layer 420 startup, orchestration layer 420 may be marked for mocking, and thus may be indicated by @FailFast(Mock=True) annotation. Thus, feature(s) associated with the data set of failed serving microservice application 440, 450, 460, 470 will mock the response of the corresponding services and fulfill the feature. For example, at least one or more of microservice applications 440, 450, 460, 470 may not be available (or failed) to serve traffic because of not passing the availability check and/or the health check. However, despite this unavailability (or failure), mock service application (similar to mock service application 195 as described above with respect to FIG. 1) may be configured to execute such that the feature(s) associated with the data set of unavailable (or failed) microservice application 440, 450, 460, 470 will be retrieved and responsive to one or more requests from orchestration layer 420. In this manner, orchestration layer 420 may be deployed after the mock service application has been executed in which a response from at least one or more of the microservice applications 440, 450, 460, 470 is mocked.

Orchestration layer 420 may be configured to receive one or more responses from different microservice applications 440, 450, 460, 470. Orchestration layer 420 may receive data from at least two of microservice applications 440, 450, 460, 470, such as microservice applications 440 and 450 prior to orchestration layer 420 orchestrating and providing the corresponding orchestrated response to client device 410. In one example, the corresponding orchestrated response transmitted from orchestration layer 420 to client device 410 may include orchestration layer 420 combining a response received from each of microservice applications, such as from 440 and 450.

With respect to communications and data transfers between orchestration layer 420 and microservice applications 440, 450, 460, 470, the solid line may represent that a connection is always available between orchestration layer 420 and microservice application, such as microservice applications 450 and 470. With respect to communications and data transfers between orchestration layer 420 and microservice applications 440, 450, 460, 470, the dashed line may represent that a request for connection thereto has been performed and a response to the request is pending, such as between orchestration layer 420 and microservice application and microservice applications 440 and 460. Microservice applications 440, 450, 460, 470 may be stateful, stateless, and/or any combination thereof. For example, stateful microservice applications 440, 450, 460, 470 may be configured to retrieve data, for example responsive to one or more requests of data from orchestration layer 420, from one or more databases (not shown). In contrast stateless microservices 440, 450, 460, 470 may be configured to receive and/or transmit one or more requests of data without saving or retrieving the data from the one or more databases (not shown), as microservices 440, 450, 460, 470 may be connected thereto, transmit data responsive to one or more requests from orchestration layer 420, and terminating the connection.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A system comprising:
   memory; and
   an orchestration layer including one or more processors, the one or more processors coupled to the memory, configured to:
   connect to a plurality of microservice applications that are each associated with a respective dataset;
   validate, responsive to the connection of each of the plurality of microservice applications, the plurality of microservice applications by performing a first test and a second test, the first test associated with determining availability, including receiving one or more status updates based on whether the plurality of microservice applications are active, the first test further associated with connectivity, including receiving one or more status updates based on whom the plurality of microservice applications are connected to; and deploy, responsive to the validation of the plurality of microservice applications, the plurality of microservice applications to execute a plurality of workflow actions,
wherein the orchestration layer further comprises a mock service application configured to override behavior of data flow, including mock data retrieval associated with at least one of the microservice applications,
wherein the orchestration layer is configured to deploy the at least one microservice application upon determining that the at least one microservice application failed the first test.

2. The system of claim 1, wherein the second test comprises a health check.

3. The system of claim 1, wherein the first test determines whether all of the plurality of microservice applications are associated with the availability and connectivity with the orchestration layer through an application programming interface (API) gateway.

4. The system of claim 2, wherein the health check determines whether all of the plurality of microservice applications are configured to serve traffic associated with the respective dataset.

5. The system of claim 1, further comprising:
a language-neutral spring integration framework configured to implement data flow between the plurality of microservice applications and the orchestration layer by a bean of the language-neutral spring integration framework.

6. The system of claim 1, wherein the first and second tests are performed for only some of the plurality of microservice applications.

7. The system of claim 1, wherein the orchestration layer is configured to call each of the plurality of microservice applications through a spanning tree protocol (STP).

8. The system of claim 1, wherein:
the mock service application is configured to override behavior of data flow, including mock data retrieval associated with the plurality of the microservice applications, wherein the plurality of microservice applications are deployed upon determining that the plurality of microservice applications failed the second test.

9. The system of claim 8, wherein a message is logged based on results of the mock service application indicative of the plurality of the microservice applications failing the second test.

10. A method comprising:
establishing, by one or more processors coupled to memory, an orchestration layer;
receiving, at the orchestration layer, a respective dataset from each of a plurality of microservice applications;
validating, by the one or more processors and based on receiving the respective dataset, the plurality of microservice applications by executing a first test prior to executing a second test, the first test associated with determining availability, including receiving one or more status updates based on whether the plurality of microservice applications are active, the first test further associated with connectivity, including receiving one or more status updates based on whom the plurality of microservice applications are connected to;
deploying, by the one or more processors and based on validating the plurality of microservice applications, the plurality of microservice applications to execute a plurality of workflow actions; and
overriding, by a mock service application of the orchestration layer, behavior of data flow including mock data retrieval associated with at least one of the microservice applications, wherein the orchestration layer is configured to deploy the at least one microservice application upon determining that the at least one microservice application failed the first test.

11. The method of claim 10, wherein the first test comprises determining whether all of the plurality of microservice applications are associated with the availability and connectivity with the orchestration layer through an application programming interface (API) gateway.

12. The method of claim 10, wherein the second test comprises determining whether all of the plurality of microservice applications are configured to serve traffic associated with the respective dataset.

13. The method of claim 10, further comprising:
implementing, by a spring integration framework, data flow between the plurality of microservice applications and the orchestration layer.

14. The method of claim 10, wherein the first and second tests are performed for only designated microservice applications.

15. The method of claim 10, wherein the orchestration layer is configured to call each of the plurality of microservice applications through a spanning tree protocol (STP).

16. The method of claim 10, further comprising:
overriding, by the mock service application, behavior of data flow, including mock data retrieval associated with the plurality of the microservice applications, wherein the plurality of microservice applications are deployed upon determining that the plurality of microservice applications failed the second test.

17. The method of claim 16, further comprising:
presenting, responsive to results of the mock service application, a message indicating that the plurality of the microservice applications failed the second test.

18. The method of claim 10, wherein the first and second tests are executed for the plurality of microservice applications in a non-sequential manner.

19. The method of claim 11, wherein the connectivity with the orchestration layer is based on a response time associated with a predetermined threshold.

* * * * *